Dec. 29, 1942. J. A. TOLMAN 2,306,986
FILTER DEVICE
Filed June 24, 1940
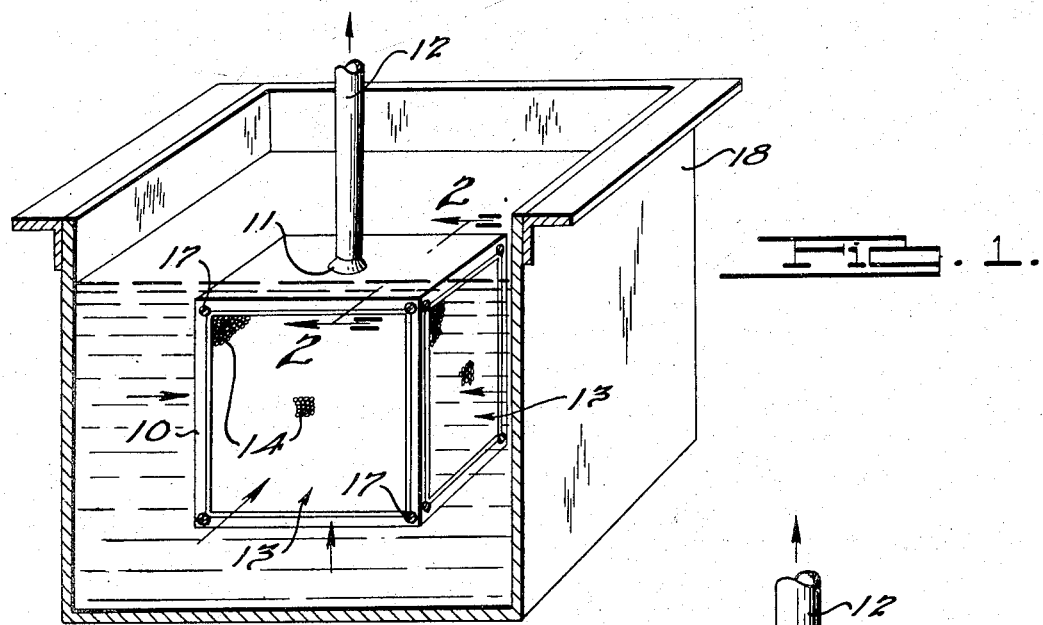
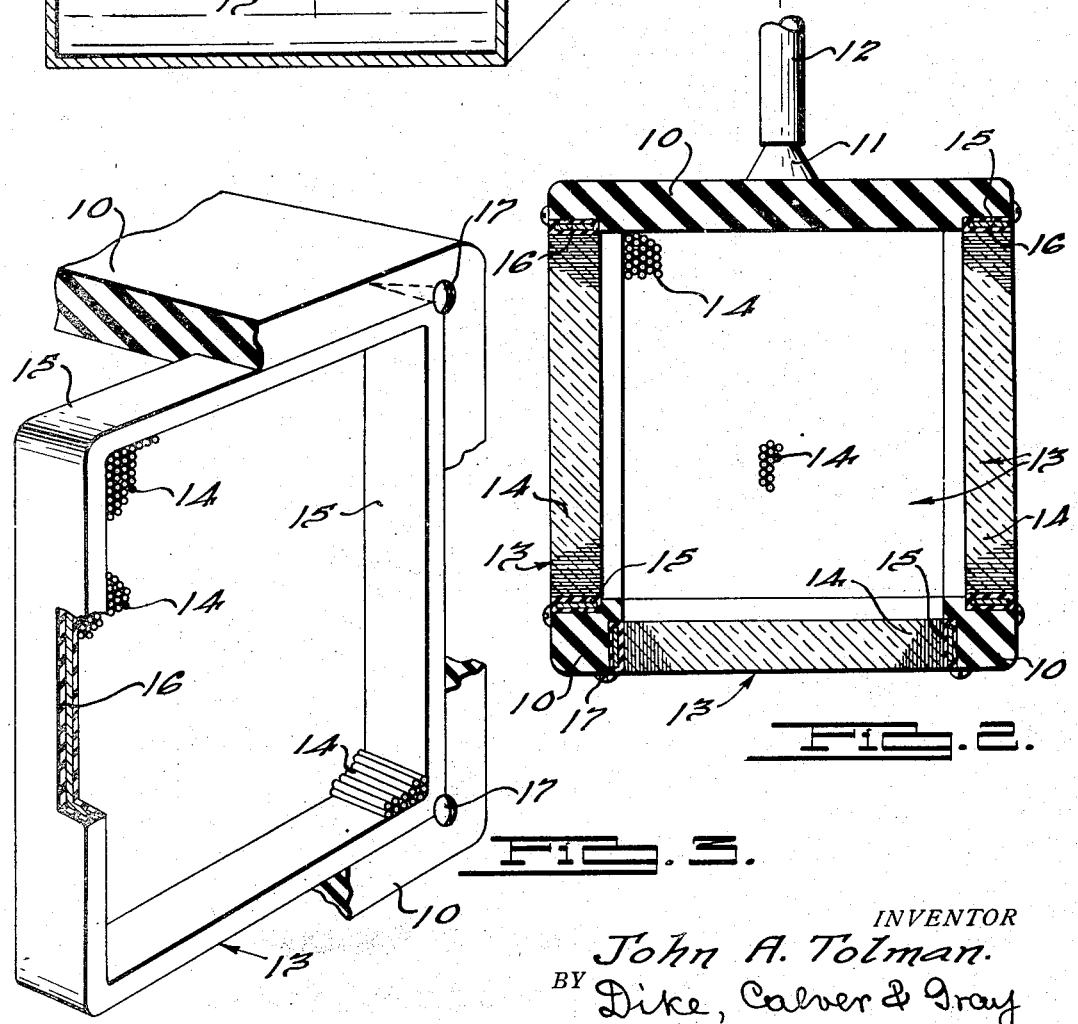
INVENTOR
John A. Tolman.
BY Dike, Calver & Gray
ATTORNEYS.

Patented Dec. 29, 1942

2,306,986

UNITED STATES PATENT OFFICE 2,306,986

FILTER DEVICE

John A. Tolman, Detroit, Mich.

Application June 24, 1940, Serial No. 342,050

2 Claims. (Cl. 210—169)

This invention relates to filter devices and more particularly to filter devices capable of filtering liquids which are highly destructive to commonly used filtering mediums.

Great difficulties have been experienced with filtering liquids of the above character, such for instance as sulfuric acid, since filtering mediums in common use, such as cloth, felt, metal screens, and the like, are incapable of resisting the destructive properties of such liquids. Other filtering mediums, such as quartz sand, proved to be very inconvenient to handle, and do not permit construction of compact filter devices having high production capacity, as is required for modern industrial plants. In view of the above, in the manufacture of many liquids, such as sulfuric acid, filtration processes have been considered impractical, and sedimentation has been usually resorted to for the purpose of separating undesirable solids. However, sedimentation is an extremely slow and tedious process.

One of the objects of the present invention is to provide an improved filter device capable of filtering liquids which destructively attack filter mediums such as cloth, metal screens, and the like, said filter device being also capable of resisting the destructive action of such liquids for a long period of time.

Another object of the invention is to provide an improved filter device for filtering highly destructive liquids, which device is very compact, has a high production capacity and is very easy to handle when cleaning or making repairs.

It is an added object of the present invention to provide an improved filter device of the foregoing character, which is simple in construction, safe and dependable in operation, and is relatively inexpensive to manufacture.

Other objects and advantages of this invention will appear in the following description and appended claims, reference being had to the accompanying drawing forming a part of this specification wherein like reference characters designate corresponding parts in the several views.

Fig. 1 is a perspective view partly in section showing the filter device embodying the present invention, said device being shown submerged in a tank containing liquid to be filtered.

Fig. 2 is a sectional view taken in the direction of the arrows on the section plane passing through the line 2—2 of Fig. 1.

Fig. 3 is a perspective view with parts broken away, said view illustrating the construction of individual filtering members and the way in which they are secured to the filter container.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated a filter device embodying the present invention. The device illustrated in the drawing is shown submerged into a tank containing the liquid to be filtered. Referring specifically to the drawing, the numeral 10 designates a container made of a material that will resist the destructive properties of the liquid to be filtered. For filtering sulfuric acid I prefer to use a container made of rubber. The container 10 is provided with an outlet nipple 11 preferably formed integrally on the container body. On the nipple 11 there is secured in any suitable manner an outlet conduit or pipe 12 with the aid of which the filtered liquid is directed to any desired place.

The container 10 is provided with a plurality of outlet openings into which are fitted filtering members generally indicated by the numeral 13. Each of said filtering members comprises a multiplicity of substantially straight strands 14, tightly compacted, and arranged in longitudinal contact to provide a multiplicity of channels between them, said channels extending lengthwise or parallel to the strands. The cross section of the channels depends upon the cross section of the individual strands. I prefer to use fine substantially cylindrical strands. The diameters of the individual strands depend upon the filtration requirements, one one-thousandth of an inch being a suitable size for an average case, although strands having a diameter as small as .0001 of an inch may be utilized. The strands are made of a material which is capable of resisting the destructive properties of the liquids to be filtered. The material of strands may vary depending upon the nature of the particular liquid for which the filter device is constructed. For filtering sulfuric acid strands of rubber or glass give very satisfactory results.

The strands in the present instance are encircled and held together under a predetermined transverse compression with the aid of a retainer member 15. In some cases it is preferable to use a retainer member made of rubber and having a reinforcing metal insert 16 completely embedded within the material of the retainer member and giving sufficient rigidity thereto. The filtering members 13 may be secured to the container body with the aid of screws 17 engaging the retainer members 15. In some instances the retainer 15 for the filter member may be dispensed with and the filter strands retained together by means of fusing material along the lines of contact of the strands. Securement of the strands together along their lines of contact may also be accomplished by first compacting a batch of strands and heating them to just sufficient a temperature to fuse the adjacent strands together, without however destroying or impairing the desired dimensional control of the capillary channels between the strands.

In the present embodiment of the invention the filtering members are provided around four sides and at the bottom of the container 10, the outlet conduit 11 being provided in the solid top wall of the container.

In some instances it may be desiirable to make the container 10 out of glass. In such cases, strands 14, if made of rubber, may be inserted directly into the shouldered recesses provided along the edges of the intake openings of the container. If glass strands are used, the same may be provided with a rubber container, in which case no reinforcing member is necessary since the retainer member will act as such only before the strands are inserted in place, after which the retainer will function partly as a gasket.

As shown in Fig. 1, the filter device is submerged in a tank 18 containing the liquid to be filtered. Suction is applied to the conduit 12 to draw the liquid through the side and bottom filtering members and depositing the solids on the intake faces of the filtering members 13. The level of the liquid in the tank 18 may be maintained at substantially the same level, and the filtering device raised from time to time for cleaning the cake formed on the faces of the filtering members. More than one filtering device can be used in one tank and such devices may be connected in batteries for convenient handling.

If viscosity of the liquid is such that its resistance to flow is relatively high, higher pressures may be necessary to drive such liquid through the capillary channels formed between the strands 14. In such cases the tank 18 may be made closed and the necessary pressure built therein with the aid of any suitable means, in which cases application of vacuum to the outlet conduit 12 may be dispensed with, if desired.

I claim:

1. In a filter device, a glass container adapted to be submerged in unfiltered acid, said container having a chamber provided with an outlet conduit at one side and a plurality of inlet openings at the other sides of the container opening into said chamber, a corresponding plurality of filtering members fitted into said openings and operatively closing the same, each of said filtering members including a quantity of glass strands held in longitudinal contact and forming filtering channels between them, said channels being parallel to said strands.

2. In a filter device, a glass container adapted to be submerged in unfiltered acid, said container having a chamber provided with an outlet conduit at one side and a plurality of inlet openings at the other sides of the container opening into said chamber, a corresponding plurality of filtering members fitted into said openings and operatively closing the same, each of said filtering members including a quantity of glass strands arranged in longitudinal contact to form filtering channels between them, said channels being parallel to the strands, and a retainer member encircling said strands and holding the same under transverse compression.

JOHN A. TOLMAN.